United States Patent [19]

Dufour

[11] 4,311,806
[45] Jan. 19, 1982

[54] POLYBLENDS OF PVC AND STYRENE-MALEIC ANHYDRIDE-RUBBER COPOLYMERS

[75] Inventor: Daniel L. Dufour, Longmeadow, Mass.

[73] Assignee: Monsanto Company, St. Louis, Mo.

[21] Appl. No.: 244,576

[22] Filed: Mar. 17, 1981

[51] Int. Cl.³ .................... C08L 51/04; C08L 27/06
[52] U.S. Cl. ........................................ 525/71; 525/74
[58] Field of Search .................................... 525/74, 71

[56] References Cited

U.S. PATENT DOCUMENTS

| | | | |
|---|---|---|---|
| 3,626,033 | 12/1971 | Kaskkula et al. | 260/876 R |
| 3,717,688 | 2/1973 | Kayanagi et al. | 260/876 R |
| 3,759,863 | 9/1973 | Czekay et al. | 260/33.6 AQ |
| 3,882,192 | 5/1975 | Elgham et al. | 260/873 |
| 3,919,354 | 11/1975 | Moore et al. | 525/245 |
| 4,197,376 | 4/1980 | Lee et al. | 525/74 |
| 4,223,096 | 9/1980 | Lee et al. | 525/74 |

*Primary Examiner*—Carman J. Seccuro
*Attorney, Agent, or Firm*—David Bennett; William J. Farrington; Paul D. Matukaitis

[57] ABSTRACT

Rubber modified copolymers of styrene and maleic anhydride can be blended with polyvinyl chloride and optional impact modifiers to produce compositions with advantageous properties.

7 Claims, No Drawings

POLYBLENDS OF PVC AND STYRENE-MALEIC ANHYDRIDE-RUBBER COPOLYMERS

BACKGROUND OF THE INVENTION

This invention relates to polyblends and specifically to polyblends of polyvinyl chloride (PVC) with certain polymers capable of conferring on the PVC improved resistance to elevated temperatures.

PVC is a widely used polymer with many advantages. It has good molding characteristics especially where plasticized, it has excellent clarity, physical properties and UV stability and it is inherently resistant to bruising. It is however comparatively sensitive to elevated temperatures such that it cannot be used in applications in which it is necessary that the product retain its dimensional stability at temperatures above about 65°–70° C.

The present invention provides a means of improving the dimensional stability of PVC without significant deterioration in critical physical properties. This is achieved by blending certain compatible styrenic polymers with the PVC.

DESCRIPTION OF THE PRIOR ART

Blends of PVC with polymers such as ABS (acrylonitrile/butadiene/styrene terpolymers) and MBS (methyl methacrylate/butadiene/styrene terpolymers) are well known for their good molding characteristics, impact strength and compatibility. In common with PVC itself however they have comparatively low softening points.

Polymers with high softening points are known but these are not always suitable for blending with PVC since, if the two are not compatible, a serious drop in significant properties such as impact strength is generally observed.

In addition it is unusual for a polymer to be able to provide at once high impact and high heat distortion to a blend with PVC. U.S. Pat. No. 3,626,033 described blends of PVC with styrene/maleic anhydride copolymers and ABS which show advantages in this respect but not to the degree shown by the present invention. A polyblend has now been discovered that combines many desirable properties to an unexpectedly high degree. The polyblend is useful for moldings that require high strength, good flame-retardant properties and can be used at temperatures higher than those accessible to PVC/ABS blends.

DESCRIPTION OF THE INVENTION

The present invention provides a polyblend comprising:

A. from 20 to 80% by weight of polyvinylchloride (PVC);

B. from 80 to 20% by weight of a rubber-modified copolymer of a vinylaromatic monomer, and unsaturated dicarboxylic acid anhydride and an optional termonomer, preferably one selected from the group consisting of $C_1$ to $C_3$ acrylates and methacrylates and unsaturated nitriles, wherein the relative weight proportions of the monomers are 50 to 85% of the vinylaromatic monomer, 15 to 30% of the anhydride and 0 to 20% of the termonomer; and wherein the monomers are polymerized in the presence of 5 to 25% by weight of a rubber having a glass transition temperature below 0° C.; and C. from 0 to 40% by weight of a composition comprising a graft copolymer of from 20 to 40% by weight of a monomer selected from the group comprising methyl methacrylate and acrylonitrile and 80 to 60% by weight of a vinyl aromatic monomer said copolymer being grafted onto from 10 to 60%, based on the weight of the composition, of a substrate rubber having a glass transition temperature below 0° C.

Component A of the polyblend is a polyvinyl chloride and it is understood that this term also is intended to embrace various degrees of halogenation of a basic hydrocarbon chain. Thus the term includes halogenated polyvinyl chloride and halogenated polyethylene as well as simple polyvinyl chloride which is the most common exemplar of such compounds. The preferred Component A is a conventional polyvinyl chloride of the kind typically sold for molding applications. The proportion of component A is preferably from 40 to 70% by weight.

Component B of the above formulation is preferably a rubber-modified styrene/maleic anhydride copolymer but the styrene can be replaced in whole or in part by other vinylaromatic monomers such α-methyl styrene, chlorostyrene, bromostyrene, p-methyl styrene and vinyl toluene. Similarly the maleic anhydride can be replaced in whole or in part by another unsaturated dicarboxylic anhydride such as itaconic, aconitic or citraconic anhydride. The termonomer, where present is most preferably methyl methacrylate.

The proportions of the monomers preferably employed give an anhydride content of from 20 to 30% and a methyl methacrylate content of 5 to 15%.

Component B comprises from 5 to 25% by weight of the rubber component and preferably from 10 to 25% by weight.

The rubber is conventionally a diene rubber such a polybutadiene or a butadiene based block or radial-block rubber. Other rubbers such as EPDM rubber, polypentenamer, polyisoprene, polychloroprene, polyacrylate rubbers and the like can, if desired, also be used.

Rubber modified copolymers are prepared by polymerizing the monomers in the presence of the rubber in such a way that a uniform copolymer of the polymerizing monomers is grafted on to the rubber substrate and a matrix copolymer of essentially the same composition as the graft copolymer is simultaneously generated. Suitable methods of producing such rubber modified copolymers are well known in the art and a typical process is described in U.S. Pat. No. 3,919,354.

Component C is typically an ABS or MBS type polymer that is to say a diene rubber substrate grafted with styrene and either acrylonitrile, methyl methacrylate or a mixture of these monomers. However the rubber need not be the conventional polybutadiene or butadiene/styrene copolymer since any rubber with a glass transition temperature below 0° C. can be used. Such rubbers include those which may provide the substrate for Component B described above.

The presence of Component C, though optional, confers additional benefits in terms of impact strength and modulus so that the inclusion of from 10 to 35% by weight of the component in the polyblends of the invention is a preferred feature.

In addition to the above components the polyblends of the invention can advantageously comprise other additives such as plasticizers, antioxidants, stabilizers, flame-retardants, fibers, mineral fibers and the like.

The components of the polyblend can be blended together by any convenient process. Usually however they are extrusion blended or compounded in a high intensity blender such as a Banbury Mixer.

Components B and C can be together provided by the formulations described in U.S. Pat. No. 4,197,376. As will be appreciated, at sufficiently large proportions of PVC the final formulation will have significant flame-retardant properties.

DESCRIPTION OF THE PREFERRED EMBODIMENTS

The invention is now described with reference to the following examples which are for the purposes of illustration only and are not intended to imply any limitation on the essential scope of the invention.

EXAMPLE

The components indicated in Table 1 below were formulated and tested for their DTUL, (using ASTM D-648.56 in 12.7 mm × 12.7 mm cross-section sample), and Izod impact (using ASTM method D-256.56). Gardner impact was measured on a 3.175 mm thickness sample using a 12.27 mm diameter dart.

The samples were also tested for flammability using the UL-94 V-test and HB-test.

From the data in Table I it is clear that preferred compositions, from the point of view of the balance of DTUL, impact strength and flame retardant characteristics, comprise from about 30 to 70% of PVC. It is also clear that MBS is a more effective impact improver for the polyblends of the invention than is ABS.

TABLE 1

| COMPOSITION | COMPARATIVE C1 | C2 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| ABS-1 | | | | | | 16 | 12 | 8 | 4 | | | | | | |
| ABS-2 | | | | | | 4 | 3 | 2 | 1 | | | | | | |
| RM-S/MA/MM | | 100 | 30 | 50 | 70 | 60 | 45 | 30 | 15 | 10 | 30 | 50 | 16 | 36 | 56 |
| PVC | 100 | | 70 | 50 | 30 | 20 | 40 | 60 | 80 | 70 | 50 | 30 | 70 | 50 | 30 |
| MBS | | | | | | | | | | 20 | 20 | 20 | 14 | 14 | 14 |
| Ethanox 330 | | | 0.1 | 0.2 | 0.3 | 0.3 | 0.3 | 0.3 | 0.3 | 0.1 | 0.2 | 0.3 | 0.1 | 0.2 | 0.3 |
| Mark 1900 | | | 2.8 | 2.0 | 1.2 | 0.8 | 1.6 | 3.4 | 3.2 | 2.8 | 2.0 | 1.2 | 2.8 | 2.0 | 1.2 |
| Butyl Stearate | | | | | | 1.0 | 1.0 | 1.0 | 1.0 | | | | | | |
| Acryloid K .175 | | | 0.7 | 0.5 | 0.3 | | | | | 1.0 | 1.0 | 1.0 | 1.0 | 1.0 | 1.0 |
| PROPERTIES | | | | | | | | | | | | | | | |
| DTUL (°C.) | 69 | 130 | 75 | 79 | 114 | 106 | 83 | 74 | 69 | 74 | 76 | 83 | 75 | 78 | 87 |
| IZOD (J/m. notch R) | 32 | 108 | 27 | 32 | 38 | 87 | 92 | 81 | 29 | 540 | 87 | 60 | 103 | 65 | 60 |
| GARDNER (J) | 1.7 | — | 0.92 | 1 | 1.3 | 10.1 | >19.2 | 17.4 | 0.8 | >19.2 | >19.2 | >19.2 | >19.2 | >19.2 | >19.2 |
| FLAMMABILITY | | | | | | | | | | | | | | | |
| UL-HB | Pass | Fail | Pass | Pass | Fail | Fail | Pass | Pass | Pass | Pass | Pass | Fail | Pass | Pass | Fail |
| Flame out (sec.) | 0 | Yes | 0.2 | 5.8 | 23 | — | 49 | 2 | 0.6 | 0.8 | 7 | — | 0.9 | 15.4 | — |
| Dripping | No | — | No | No | No | No | No | No | No | No | No | No | No | No | No |
| UL-V test | | | | | | | | | | | | | | | |
| Dripping | No | — | No | No | No | | | | | | | | | | |
| Rating | V-O+ | Fail | V-O | V-O | Fail | | | | | | | | | | |

The components described below were blended in a number of different ratios and tested for various properties.

ABS-1—prepared by the graft emulsion polymerization of acrylonitrile and styrene in a weight ratio of 30:70 in the presence of polybutadiene. ABS-1 contains 40% by weight of polybutadiene.

ABS-2—prepared by the graft suspension polymerization of acrylonitrile and styrene in a weight ratio of 28:72 in the presence of polybutadiene. ABS-2 contains 14% by weight of polybutadiene.

RM-S/MA/MM—prepared by polymerizing a monomer mixture of styrene, maleic anhydride and methyl methacrylate in the presence of rubber to produce a composition in which the above monomers are the weight proportions 72:22:6 respectively and which contains 14% of the rubber.

PVC—Rucon B-221 (Hooker Chemical Co.)

MBS—Acryloid-K653 (Rohm & Haas Co.) a methylmethacrylate/butadiene/styrene terpolymer.

Plasticizers/Flow Aids—Butyl Stearate —Acryloid K-175 (Rohm & Haas) an acrylic polymer Antioxidants/Stabilizer—Ethanox 330—an alkylated phenol available from Ethyl Corp.

Mark 1900—a methyl tin mercapto ester complex available from Argus Chemical Co.

What is claimed is:

1. A polyblend composition comprising:
   A. from 20 to 80% by weight of polyvinylchloride
   B. from 80 to 20% by weight of a rubber-modified copolymer of a vinylaromatic monomer, and unsaturaed dicarboxylic acid anhydride and copolymerizable termonomer, wherein the relative weight proportions of the monomers are 50 to 85% of the vinylaromatic monomer, 15 to 30% of the anhydride and 0 to 20% of the termonomer; and wherein the monomers are polymerized in the presence of 5 to 25% by weight of a rubber having a glass transition temperature below 0° C; and
   C. from 0 to 40% by weight of a composition comprising a graft copolymer of from 20 to 40% by weight of a monomer selected from the group comprising methyl methacrylate and acrylonitrile and 80 to 60% by weight of a vinyl aromatic monomer said copolymer being grafted onto from 10 to 60%, based on the weight of the composition, of a substrate rubber having a glass transition temperature below 0° C.

2. A composition according to claim 1 in which the termonomer in Component B is selected from the group consisting of $C_1$ to $C_3$ alkyl acrylates and methacrylates and unsaturated nitriles.

3. A composition according to claim 2 in which component B is a rubber-modified styrene/maleic anhydride/methyl methacrylate terpolymer.

4. A composition according to claim 1 that incorporates from 10 to 35% by weight of Component C.

5. A composition according to claim 1 in which Component C is a rubber modified styrene/methyl methacrylate copolymer.

6. A composition according to claim 1 in which Component C is a rubber modified styrene/acrylonitrile copolymer.

7. A composition according to any one of claims 1 to 6 in which Component A represent from 40 to 70% of the composition weight.

* * * * *

Disclaimer

4,311,806.—*Daniel L. Dufour*, Longmeadow, Ma. POLYBLENDS OF PVC AND STYRENE-MALEIC ANHYDRIDE-RUBBER COPOLYMERS. Patent dated Jan. 19, 1982. Disclaimer filed Sept. 12, 1983, by the assignee, *Monsanto Co.*

Hereby enters this disclaimer to all claims of said patent.

[*Official Gazette February 21, 1984.*]